United States Patent
Wong et al.

(10) Patent No.: US 6,330,460 B1
(45) Date of Patent: Dec. 11, 2001

(54) SIMULTANEOUS FORWARD LINK BEAM FORMING AND LEARNING METHOD FOR MOBILE HIGH RATE DATA TRAFFIC

(75) Inventors: Piu Bill Wong, Monte Serno; Shimon B. Scherzer, Sunnyvale; Ravi Narasimhan, Los Altos, all of CA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

(21) Appl. No.: 09/643,381

(22) Filed: Aug. 21, 2000

(51) Int. Cl.[7] ........................................ H04B 1/38
(52) U.S. Cl. ..................... 455/562; 455/561; 455/517
(58) Field of Search ................................ 455/561, 562, 455/517, 512, 525; 370/334, 329, 338, 347, 349, 468, 252

(56) References Cited

U.S. PATENT DOCUMENTS

| | | | |
|---|---|---|---|
| 5,471,647 | * 11/1995 | Gerlach et al. | 455/63 |
| 5,634,199 | 5/1997 | Gerlach et al. | 455/63 |
| 5,666,655 | * 9/1997 | Ishikawa et al. | 455/512 |
| 5,818,385 | * 10/1998 | Bartholomew et al. | 342/372 |
| 6,014,570 | 1/2000 | Wong et al. | 455/500 |
| 6,127,988 | * 10/2000 | McNichol et al. | 343/844 |

OTHER PUBLICATIONS

M.C. Wells, "Increasing the capacity of GSM cellular radio using adaptive antennas", IEE (UK) Proc. On Comm. vol. 143, No. 5, Oct. 1996, pp. 304–310.

S. Anderson, B. Hagerman, H. Dam, U. Forssen, J. Karlsson, F. Kronestedt, S. Mazur and K. Molinar, "Adaptive Antennas for GSM and TDMA Systems", IEEE Personal Communications, Jun. 1999, pp. 74–86.

\* cited by examiner

*Primary Examiner*—Vivian Chang
*Assistant Examiner*—John J. Lee
(74) *Attorney, Agent, or Firm*—Fulbright & Jaworski L.L.P.

(57) ABSTRACT

Disclosed is a base station of a wireless communications system including an adaptive antenna array and beam forming means for forming simultaneous multiple forward link beams. Preferably mobile stations are separated into groups of mobile stations corresponding to a maximum number of simultaneous forward link beams for determining which of said groups can be served by compatible simultaneous forward link beams. Preferably, if mobiles remain outside of a compatible group, the number of simultaneous forward link beams is increased and grouping of the mobile stations is repeated until all the mobile stations are included in compatible groups. Preferably simultaneous data beams are formed to mobiles of a said group during a time interval accorded to said group, such that every mobile station receives service data during a full cycle of said time intervals at a rate equal to or in excess of a target service data rate for that mobile.

20 Claims, 6 Drawing Sheets

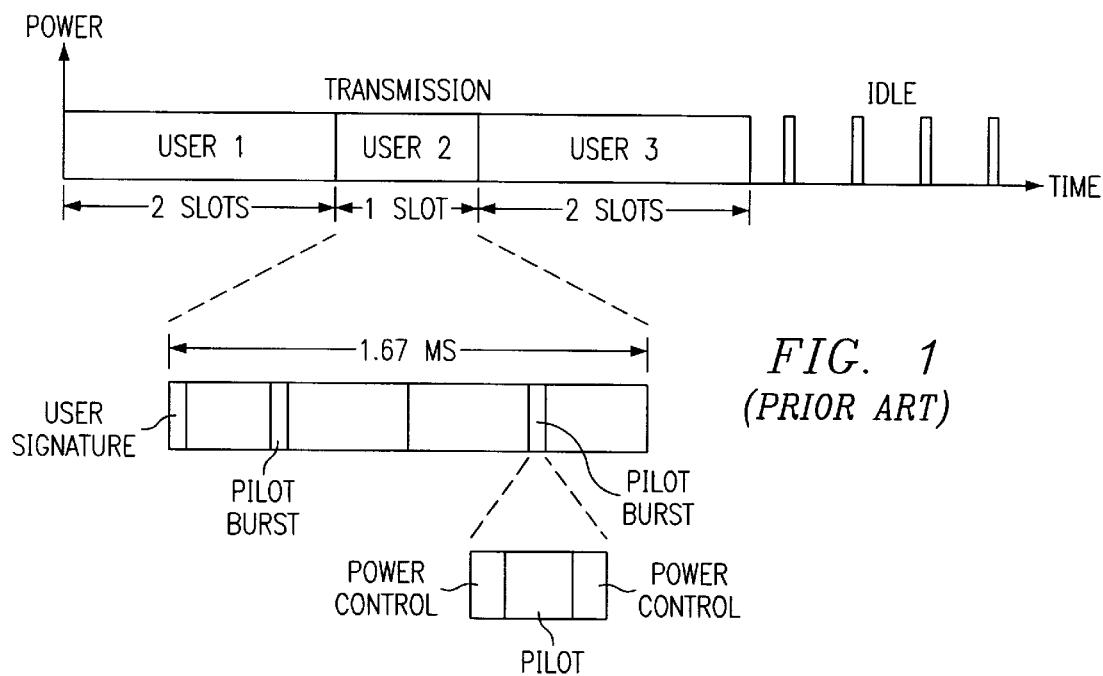
FIG. 1
(PRIOR ART)
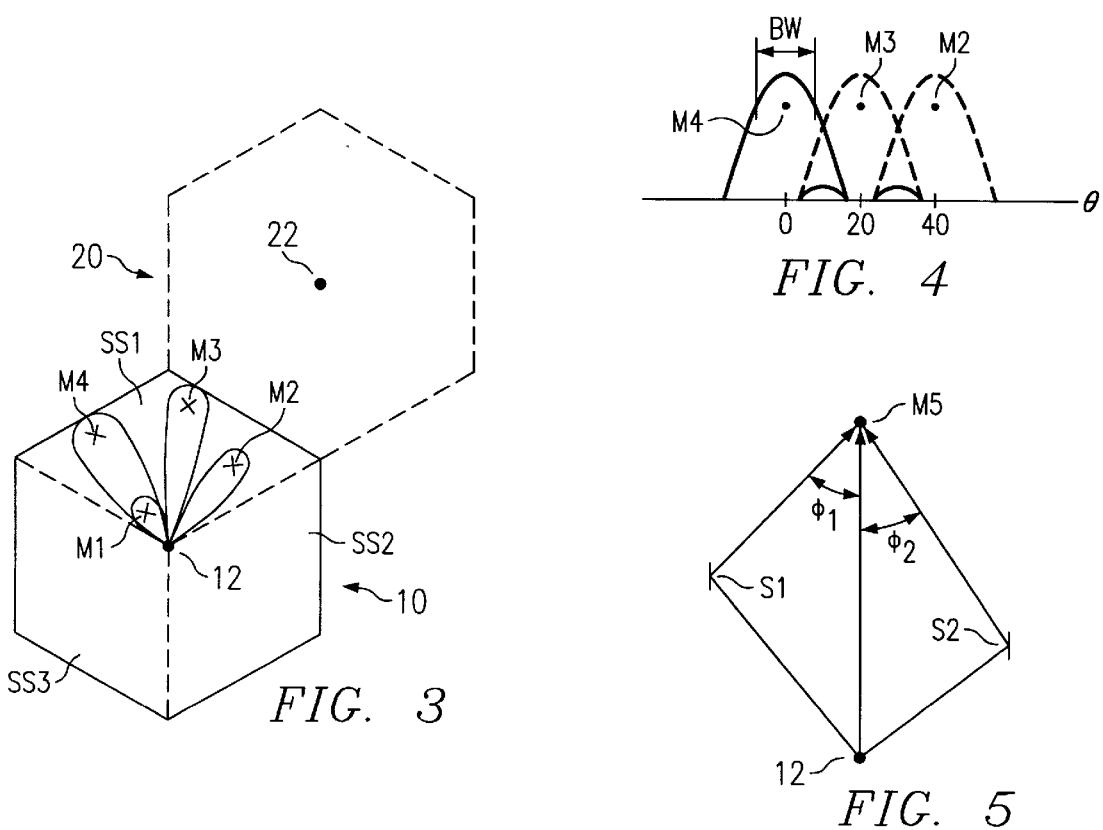
FIG. 3
FIG. 4
FIG. 5

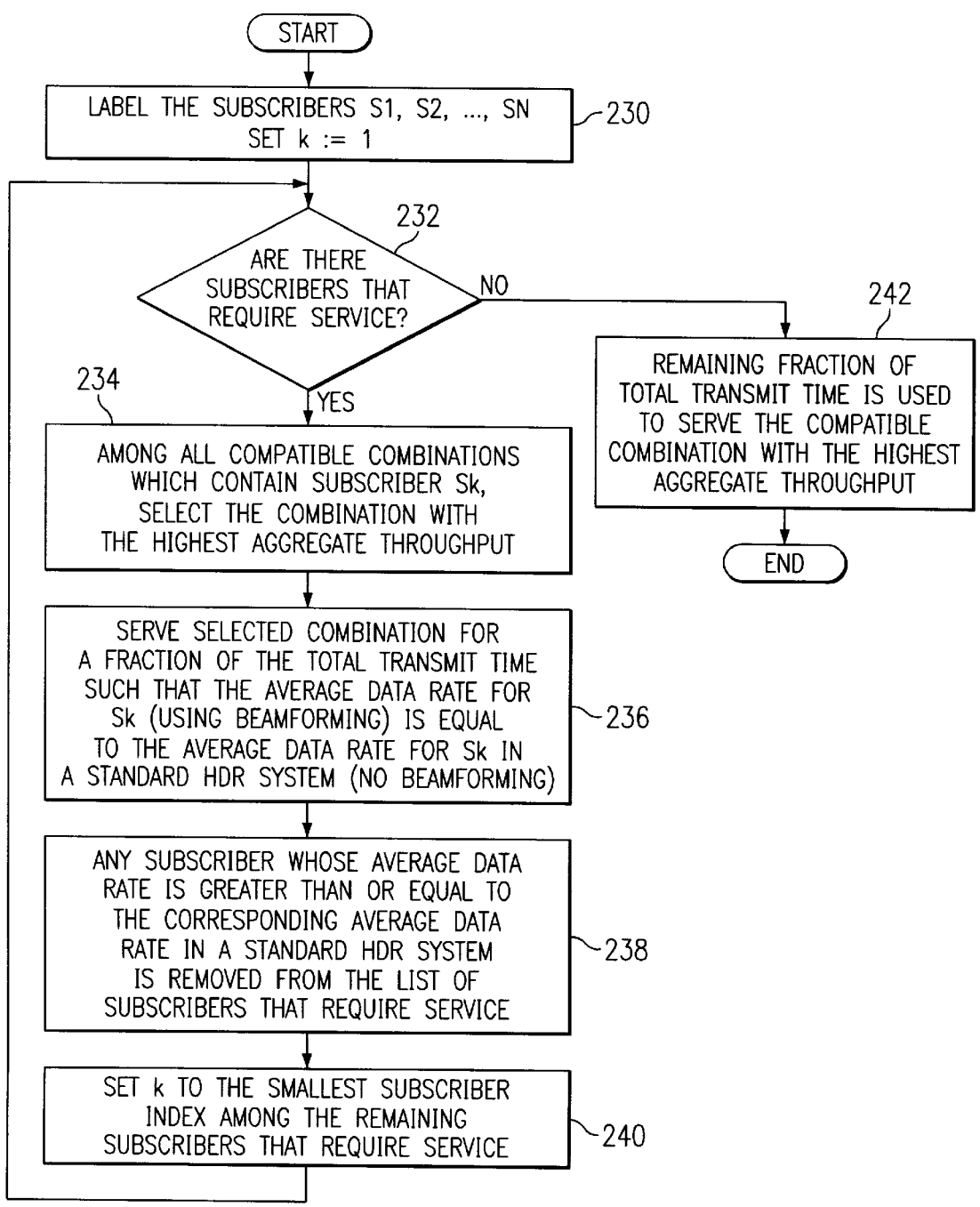

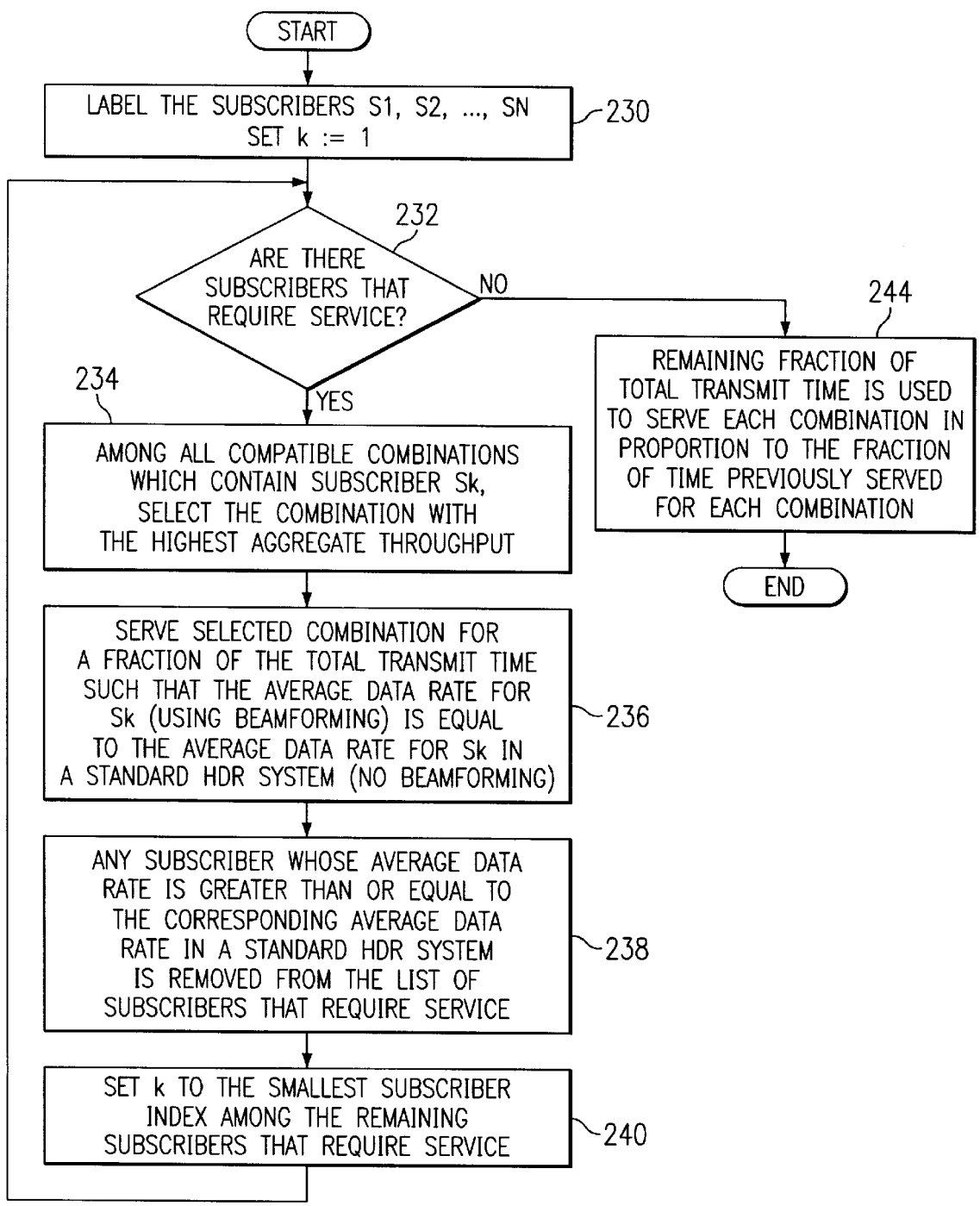

SIMULTANEOUS FORWARD LINK BEAM FORMING AND LEARNING METHOD FOR MOBILE HIGH RATE DATA TRAFFIC

FIELD OF THE INVENTION

The present invention relates to, and finds utility within, wireless information communications systems. More particularly, the present invention relates to forward link beam forming and interference cancellation via a base station adaptive antenna array in order to increase data rate to subscriber units (mobiles) within a service sector of a wireless communication system employing e.g. a CDMA air interface.

BACKGROUND OF THE INVENTION

High-speed digital data transfers via the so-called "internet" have become ubiquitous in modern society. At the same time, the world has experienced an explosion in wireless communications technology. In well developed countries like the United States, wireless communications, particularly cellular telephone services, have proliferated as an adjunct to the wired communication network backbone. In less developed countries, wireless communication service is being developed as a primary communications medium. A need has arisen to provide digital data wireless service at ever increasing effective data rates.

Wireless radio telecommunications systems enable many mobile users or subscribers to connect to land-based wire-line telephone systems and/or digital Internet service providers enabling access to the World Wide Web digital information backbone. Conventional wireless air-interfaces include frequency division multiple access (FDMA), time division multiple access (TDMA), and code division multiple access (CDMA), and improvements therein.

The CDMA air-interface calls for modulation of each carrier with a unique pseudorandom (pseudo-noise) code. As the CDMA users simultaneously occupy the same frequency band, the aggregate data signal transmitted by a fixed base station (forward link) is noise-like. A common pilot tone is transmitted to all mobiles within the effective service area of the base station. Individual signals are extracted at the mobile by correlation processing timed by the pilot tone.

Transfer of digital data packets differs from the transfer of digital voice information. Full duplex (simultaneous two-way) voice communication patterns imply that the data transferred between the base station and a particular mobile are real-time and substantially equal in bandwidth. It has been noted that a total delay of 200 msec (about 2 Kbit of digital data for most speech vocoders) represents intolerable latency within a voice channel. On the other hand, transfer of digital data packets is typically asymmetrical, with many more packets being sent from the base station to a particular mobile via a downlink or "forward link", than from the mobile to the base station via an uplink or "reverse link". In addition, for high speed data packet transfers, users appear to be far more tolerant of data transfer latencies or delays, with latencies of up to 10 seconds being encountered in current wireless data systems. While such delays appear to be tolerated by the user, the delays, attributable to relatively low effective data transfer rates, are undesirable.

One proposed solution, known as "CDMA/HDR", uses known techniques to measure channel data transfer rate, to carry out channel control, and to mitigate and suppress channel interference. One approach of this type is more particularly described in a paper by Paul Bender, Peter Black, Matthew Grob, Robert Padovani, Nagabhushana Sindhushayana and Andrew Viterbi, entitled: "CDMA/HDR: A Bandwidth Efficient High Speed Wireless Data Service for Nomadic Users", published on the internet at the time of filing of this application by Qualcomm Corporation at the following URL:

"http://www.qualcomm.com/hdr/pdfs/CDMA_HDR_IEEE.pdf". The disclosure of this article is incorporated herein in its entirety by this reference thereto.

In the Qualcomm approach described in the above article, each mobile station measures the received signal-to-interference-plus-noise ratio (SINR) based on the received common pilot sent out by the base station. The data rate which can be handled by the particular mobile is proportional to its SINR. Therefore, the mobile will repetitively determine forward link SINR and communicate a maximum supportable data rate back to the base station via the mobile's reverse link channel.

Mobiles are separated into N groups or user classes according to their respective SINR levels. Time slots are assigned successively to each user class, one at a time. The average rate of transfer of data from a base station is defined as "throughput". Latency is inversely proportional to data rate. Lower SINR (and data rate) users would ordinarily have a proportionately higher latency. However, if all users are to have essentially the same latency irrespective of individual data rate, a time slot allocation strategy inversely proportional to rate is adopted. As each user class is served, it is allocated a number of time slots inversely proportional to its rate. A compromise strategy is proposed which guarantees that the highest latency is no more than eight times the lowest individual latency, for example.

As shown in FIG. 1 forward link packet transmissions are time-multiplexed and transmitted at a full base station power level, but with data rates and time slot durations which vary according to base-to-mobile (user) channel (forward link maximum data rate) conditions. When a mobile's data queue is empty, the base station periodically broadcasts very brief pilot and control burst information, thereby reducing interference to adjacent cells. In the proposed HDR scheme, a minimum data rate is set at 76.8 kbps using 128 byte packets and QPSK modulation, and a maximum data rate is set at 2457.6 kbps using 512 byte packets and 16QAM modulation.

While the proposed HDR method provides for a minimum data rate for each mobile, it should be apparent from inspection of FIG. 1 that only one mobile (user) is able to receive data from the base station during a single time slot. If, for example, a first subscriber requests a data rate of 1000 kbps and a second subscriber requests a data rate of 2000 kbps, from the base station, in the proposed HDR method the service time will be divided into two service intervals, e.g. each one half second long. The first subscriber will experience a 500 kbps data rate, and the second subscriber will experience a 1000 kpbs data rate, because each subscriber is serviced not more frequently than 50 percent of the time. The average base station throughput in this example is 1500 kbps. Thus, a hitherto unsolved need has arisen for a more efficient method for sending data to a plurality of mobile stations being served by a base station.

Adaptive antenna array technologies employing feedback signals to optimize directional properties of information signals are known. Examples of spatial diversity multiple access methods employing adaptive antenna arrays are described in U.S. Pat. Nos. 5,471,647 and 5,634,199 to Gerlach et al., an article by M. C. Wells, entitled: "Increasing the capacity of GSM cellular radio using adaptive antennas", IEE (UK) Proc. on Comm. Vol. 143, No. 5, October 1996, pp. 304–310; and an article by S. Anderson, B. Hagerman, H. Dam, U. Forssen, J. Karlsson, F. Kronestedt, S. Mazur and K. Molinar, entitled: Adaptive Antennas for GSM and TDMA Systems", *IEEE Personal Communications*, June 1999, pp. 74–86.

Methods and structures for providing rapid beamforming for both uplink and downlink channels using adaptive antenna arrays are described in commonly assigned, copending U.S. patent applications Ser. Nos. 08/929,638 and 09/229,482 of co-inventor Scherzer, entitled: "Practical Space-Time Radio Method for CDMA Communication Capacity Enhancement". Commonly assigned U.S. patent application Ser. No. 09/511,665 of co-inventors Wong and Scherzer, entitled: "Transmitting Beamforming in Smart Antenna Array Systems" describes a method for forming simultaneous forward link beams with common pilot and traffic data phase matching and without using dedicated pilots. The disclosures of the foregoing commonly-assigned patents and co-pending patent applications are incorporated herein by reference in their respective entireties.

Interference cancellation methods in handsets or mobile stations having plural antennas and receive chains and employing directed matrix inversion methods are known, as exemplified by U.S. Pat. No. 6,014,570 to co-inventor Wong and another, entitled: "Efficient Radio Signal Diversity Combining Using a Small Set of Discrete Amplitude and Phase Weights", the disclosure thereof being incorporated herein by reference thereto.

A hitherto unsolved need has arisen for a method for controlling the FIG. 2 base station to improve digital data packet throughput of the FIG. 1 conventional HDR approach.

SUMMARY OF THE INVENTION WITH OBJECTS

One object of the present invention is to increase the aggregate digital data packet throughput of a wireless communications system service sector by simultaneously transferring digital data packets to multiple mobile stations served by the sector's base station via forward link beam forming such that every mobile station being served has at least a base line minimum forward link data rate, and some mobile stations have forward link data rates vastly in excess of the base line minimum forward link data rate.

Another object of the present invention is to improve data transfer rate in a wireless digital data system by adding a dedicated pilot on top of a common pilot of a beam formed forward link signal from a base station to a mobile station thereby to aid coherent demodulation of the forward link digital data stream at the mobile.

A related object of the present invention is to set a power level of a dedicated pilot inversely to the signal-to-interference-plus-noise ratio (SINR) of a mobile, for example by increasing the dedicated pilot power for a beam formed for a mobile when it is located at an outer peripheral region of the service area and interference levels from adjacent service cells are higher, while decreasing dedicated pilot power for a beam formed for a mobile when it is located nearer the base station or when the mobile otherwise has a high signal to noise plus interference ratio within the service sector.

Another object of the present invention is to maintain a common pilot forward link signal transmitted from a base station to mobile stations which do not recognize beam forming, while selectively adding a dedicated pilot in addition to the common pilot within beam formed signals directed to mobiles which recognize beam forming.

A further object of the present invention is to form and maintain a data base of compatible mobile station locations within a service sector for which multiple simultaneous beams may be formed, and to use that data base to form multiple simultaneous beams to mobiles requesting service within the service sector thereby to increase service sector aggregate digital data throughput.

A related further object of the present invention is to create a service list of compatible combinations of mobiles awaiting service within the service sector via simultaneous multiple beams, starting by forming a combination of simultaneous beams to mobiles including a mobile having a lowest effective data rate, followed by combinations of other mobiles having increasing effective data rates, until all of the mobiles within the service sector have been serviced within a time-divided transmission interval.

One more object of the present invention is to allocate any excess transmission time remaining within a transmission interval in accordance with a predetermined service algorithm, such as maximum service sector data throughput, or equalized service sector data throughput.

Yet another object of the present invention is to increase aggregate base station data throughput by forming simultaneous multiple forward link beams to mobiles within its service sector by using a method providing common pilot and traffic data phase matching without using dedicated pilots.

In accordance with principles of the present invention, a method is provided for operating a base station serving multiple mobile stations within a predetermined spatial area. The base station includes an adaptive antenna array and forward link beam forming circuitry for forming simultaneous multiple forward link beams, each beam being spatially directed and adapted to serve one of the multiple mobile stations. The base station receives packets of digital traffic data and sends the packets to the mobile stations via the adaptive antenna array. The operating method of the present invention includes steps of:

a. separating the multiple mobile stations into L!/N! (L−N)! groups of mobile stations, where L is the total number of mobile stations in the area presently requesting traffic data transfer and N is an integer corresponding to a maximum number of simultaneous forward link beams capable of being formed by the adaptive antenna array;

b. determining which of said groups can be served by compatible simultaneous forward link beams and recording each of those groups determined to be compatible as a compatible group, c. if a mobile station remains outside of all compatible groups following step b, reducing the magnitude of N by an integer factor X, and repeating step a and step b until all the L mobile stations are included in compatible groups; and, d. simultaneously forming plural forward link data beams to a plurality of mobile stations of a compatible group during one time interval from among a plurality of time intervals within a service cycle, there being a time interval accorded to each compatible group such that L mobile stations receive digital traffic data during the service cycle.

In one aspect of this facet of the invention step b. includes a further step of:

e. determining from all of the compatible groups which contain a location close to the location of a currently unserved lowest mobile index said mobile Sk one group of mobiles including mobile Sk and one other mobile Sj having a highest aggregate throughput data rate; step d includes a further step of:

f. forming simultaneous forward link data beams to said one group of mobiles including mobile Sk for a time interval of the service cycle, such that the average data rate for mobile Sk is equal to a target average data rate Dk; and further steps include:

g. removing the mobile Sj within the said one group whose average data rate is greater than the target average data rate Dj from the service list; and, h. determining a next currently unserved lowest data rate mobile Sk+1, and repeating steps a–g until every mobile station has received data during the service cycle.

In a related aspect the method of the invention includes a further step of forming simultaneous forward link data beams to serve a group having a highest aggregate data throughput during a remainder of the service cycle not required by steps a–h. Alternatively, the further step of forming simultaneous forward link beams for a remainder of the service cycle services each one of the compatible groups in proportion to a fraction of the service cycle previously used by the said one of said groups during steps a–h.

As a related aspect of the present invention each mobile requests a desired data transfer rate to said base station via a reverse link and the base station estimates relative angular location and radial distance of each said mobile within the service area.

As one more aspect of the present invention, the step of determining which of said groups can be served by compatible simultaneous forward link beams and recording each of those groups determined to be compatible as a compatible group includes progressive steps of:

forming a service queue of compatible combinations by identifying C(N) combinations of mobiles taken N at a time until all mobiles of said group are within a combination;

transferring data packets to the mobiles of the combination via simultaneous forward link beams from said base station;

determining whether average data rate measured by each mobile of the combination is equal to or in excess of a target average data rate for said mobile and if so recording the combination as a compatible combination; and, continuing to form and record compatible combinations and simultaneous beams until all mobiles in the service area have been recorded as being within compatible combinations.

The foregoing objects and aspects of the present invention will be more fully understood and appreciated by those skilled in the art upon consideration of the following detailed description of preferred embodiments presented in conjunction with the accompanying drawings.

BRIEF DESCRIPTION OF THE DRAWINGS

In the Drawings:

FIG. 1 is signal power versus time diagram of a CDMA/HDR digital data traffic time division data signal format diagram proposed in the prior art.

FIG. 3 is a simplified plan diagram of a cellular system beam pattern showing the FIG. 2 cell base station forming simultaneous beams for sending digital packet information to a plurality of, but not all, mobile stations within a service sector in accordance with principles of the present invention.

FIG. 4 is a beam amplitude versus radiation angle diagram of the beams formed by the FIG. 2 base station.

FIG. 5 depicts an environment of the FIG. 2 base station giving rise to multiple paths and relative wide beam angle at one of the mobile stations.

FIG. 9 is a flowchart of method steps for allocating service slot time to compatible combinations of mobiles as determined by the FIG. 8 process and for allocating excess service slot time to a compatible combination of mobiles having a highest aggregate data rate in order to provide a maximum base station data throughput.

FIG. 10 is a flowchart of the compatible combinations method steps as shown in FIG. 9 and a step for allocating excess service slot time more equitably than the FIG. 9 approach to all of the compatible combinations of mobiles within the spatial service area of the base station in relation to fractional time allocated to each combination.

DETAILED DESCRIPTION OF A PREFERRED EMBODIMENT

Figure 2:
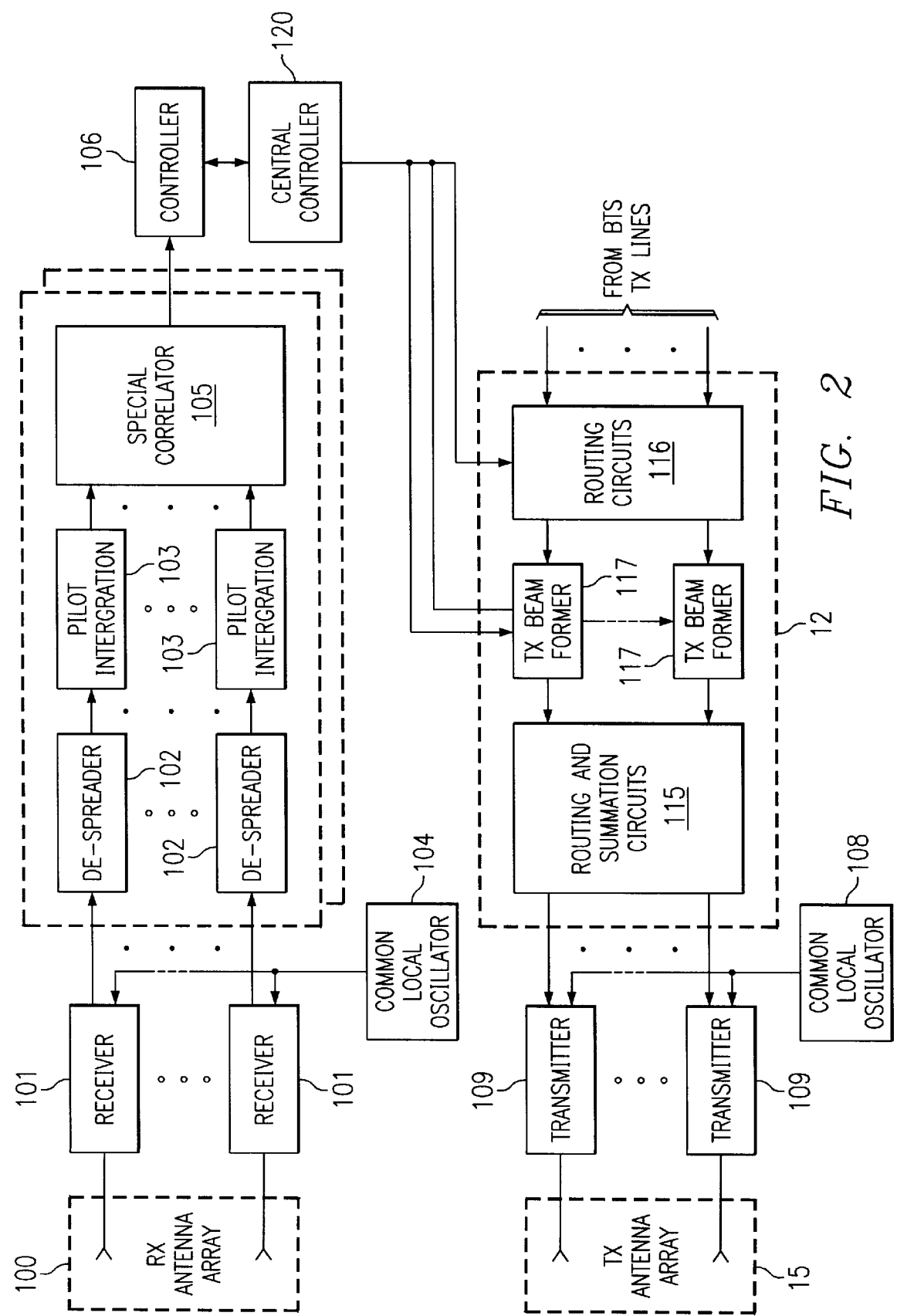
FIG. 2 is a high-level block diagram of a CDMA/HDR base station using an adaptive antenna array and dedicated pilots for generating plural simultaneous forward link beams to mobile stations within a service sector in accordance with principles of the present invention.

Beam forming has been shown to increase the capacity within wireless communications systems employing, for example, a CDMA air interface. An example of a HDR base station 12 employing an adaptive antenna array is set forth in the FIG. 2 block diagram. Therein, a multi-element receive antenna array 100 delivers collected radio frequency energy to a plurality of receiver channels 101. Each receiver channel also includes a de-spreader 102 and a pilot integrator 103. Outputs from the integrators 103 feed into a spatial correlator 105 which feeds a controller 106. The output of controller 106 is used to control transmit beam forming via a central controller 120. Routing circuits 116 receive signals e.g. from the wired telephone network and pass those signals through forward link beam formers 117 which add a dedicated pilot to each beam in this particular example. Routing and summation circuits 115 supply the beams to particular transmitter chains 109. A common local oscillator 108 provides the common pilot to the transmitter chains 109. Multiple forward link beams, each having a dedicated pilot, are simultaneously radiated by multiple elements of a Tx antenna array 122. This arrangement is described in greater detail in commonly assigned, copending U.S. patent application Ser. No. 09/229,482, referred to and incorporated hereinabove by reference.

Alternatively, the simultaneously formed forward link beams may be generated without dedicated pilots in accordance with methods and arrangements set forth in commonly assigned, copending U.S. patent application Ser. No. 09/511,665 filed on Feb. 23, 2000, referred to and incorporated hereinabove by reference. This patent application describes in detail forward link beam forming algorithms for enhancing pilot and traffic data phase matching without requiring dedicated pilots.

In FIG. 3 a service station or "cell" 10 of a wireless system comprises a CDMA/HDR base station, such as base station 12 of FIG. 2 or a non-dedicated-pilot base station of application Ser. No. 09/511,665, which sends out beam formed forward link signals to mobile stations which pass into or are otherwise located within a service area or "sector" of the base. As used herein the terms "mobile" or "mobile station" denote transmitter-receiver which receives a forward link signal from the base station 12 and transmits a reverse link signal to the base station 12 in accordance with a compatible air-interface, such as CDMA. "Mobile" is synonymous with "user", "subscriber" or "service subscriber" and may be embodied within a vehicle, or a handset, or may be installed at a fixed location within the service sector, and should not be restricted to a unit or handset in motion within the service sector.

The cell 10 is typically one of a number of "hexagonal" cells, and an adjacent cell 20 and base station 22 are also shown in broken line outline in FIG. 3. Signals sent from base station 22 can provide a significant source of interference to mobiles within a first service sector SS1 of the cell 10. Typically, there are three service sectors SS1, SS2 and SS3 for each cell, although a fewer or greater number of service sectors may be provided within any particular service cell, as is well understood by those skilled in the art.

In the FIG. 3 example, four stations, M1, M2, M3 and M4, are shown presently to be located within the first service sector SS1 of the exemplary cell 10. Station M1 is shown to be presently in very close relative proximity to the base station 12 and has a highest forward link data rate. Station M2 is intermediately located relative to the base station 12 and a cell boundary with cell 20 and has a medium data rate, while stations M3 and M4 are shown to be located just within the cell boundary at the edge of the service area of service sector SS1 and experience relatively low data rates. Base station 12 simultaneously forms and transmits directional beams to groups of the mobiles M1, M2, M3, and M4, in accordance with principles of the present invention. As formed in accordance with a CDMA air-interface, each beam includes a common pilot which is sent to all of the mobiles in the sector SS1, and this common pilot aids each mobile in determining its highest effective data rate. Most preferably, each simultaneously formed beam also includes a dedicated pilot having an amplitude inversely related to the recipient mobile's currently effective data rate.

In the present example of FIG. 3, it will be seen that beams for serving mobiles M1 and M4 spatially overlap and cannot be served simultaneously since forward link signal powers will create mutual interference. In this example, a separate beam is sent to mobile M4 during one time slice of a service interval. During another time slice of the service interval simultaneous beams are sent to mobiles M1, M2 and M3 (so long as the mobiles M1, M2 and M3 are separated by a minimum angular spacing relative to base station 12). If angular spacing between adjacent mobiles is at least a minimum angle, most typically at least about 20 degrees as shown in FIG. 4 and dependent upon the particular wave propagation environment, then beams to angularly-spaced-apart mobiles, such as mobiles M1, M2 and M3 (or M4 in lieu of M1 but not both), may be formed simultaneously in a manner such that each beam having an orthogonal dedicated pilot is nulled with respect to each adjacent beam, e.g. by use of a least squares method for forming the nulls as a complement of an orthogonal projection, in order to reduce interference.

The beam forming strategy in accordance with the present invention is to form as many simultaneous beams within each time slot as possible of a sector service cycle, since an increase in the number of simultaneous beams increases the aggregate data throughput rate of the service sector, e.g., exemplary sector SS1. As shown in FIG. 4, each simultaneously formed beam most preferably has a beam width BW which envelopes the recipient mobile and provides a tolerance or operating range to provide continuing service as the mobile moves through the particular service sector SS.

Within the HDR convention proposed by the Qualcomm paper referred to above, each mobile periodically sends a data request control (DRC) message back to the base via a reverse link which informs the base station of a highest acceptable data rate at which the particular mobile can receive data traffic from the base via the forward link. This highest acceptable data rate is typically determined by the mobile based upon determination of its signal to-interference-plus-noise ratio (SINR) at the mobile given its relative location to the base station, the strength of the common pilot, ambient interfering sources, propagation conditions, etc. Further, the reverse link signal from each mobile enables the base station to estimate the angular position and radius of the mobile from the base station. This information is used in forward link beam forming by the base station.

Highest forward link effective data rate at a particular mobile station depends upon a number of ambient conditions including, for example, path loss, shadowing, fading, and angle spread. The minimum practical angle between adjacent mobiles enabling formation of simultaneous beams depends upon angle spread of the forward link beam as received by a particular mobile station. For example, in FIG. 5, a mobile station M5 receives a relatively wide forward link beam because of a multipath environment within a particular service environment, such as service sector SS1. In this environment surfaces S1 and S2 reflect components of the forward link beam from the base station 12. These reflected (or refracted) components arrive at the mobile station antenna at angles $\phi 1$ and $\phi 2$ relative to a direct (line of sight) path from the base. The sum of angles $\phi 1$ and $\phi 2$ represents the angular spread of the forward link beam as viewed from the base station 12 in the direction of the mobile station M5. Usually, the forward link beam angle spread is widest for mobiles close to the base station and can represent 30 to 60 degrees, and narrowest for mobiles at the farthest radius of the effective service area of the base station and can represent a few degrees or less. Wide angle spreads are also attributable to the character of the propagation environment. Urban areas with densely packed high rise buildings tend to produce wider angle spreads, whereas flat, undeveloped rural or farming areas tend to produce narrower angle spreads.

In this manner of forward link beam forming, more particularly shown and described in commonly assigned, copending U.S. patent application Ser. No. 09/229,482, previously incorporated herein by reference, during one forward link time division interval (time slot), simultaneous beams are formed with dedicated pilots and sent with traffic data from base station 12 to mobile M1 at its high data rate, to mobile M2 at its medium data rate, and to mobile M3 at its relatively low data rate. Traffic data is then sent to mobile M4 at its requested data rate in a second beam forming packet during a second time slot (most preferably with data being sent in simultaneously formed beams to other angularly-spaced-apart mobiles present and actively requesting traffic data within sector SS1). Alternatively, simultaneous forward link beams may be formed without dedicated pilots and sent to groups of angularly-spaced-apart mobiles of a service sector in accordance with commonly assigned U.S. patent application Ser. No. 09/511,665 previously incorporated herein by reference.

Simultaneous beams are formed in a manner such that the average data rate for each mobile using beam forming is at least as high as the average data rate for a subscriber serviced by a standard HDR base station without beam forming. In this manner the aggregate data throughput using beam forming in sector SS1 provides a dramatic increase in aggregate data rate over data transfer rates of standard HDR in a comparable cell under comparable traffic load, in accordance with principles of the present invention which will be further explained and exemplified in greater detail hereinafter.

Figure 6:
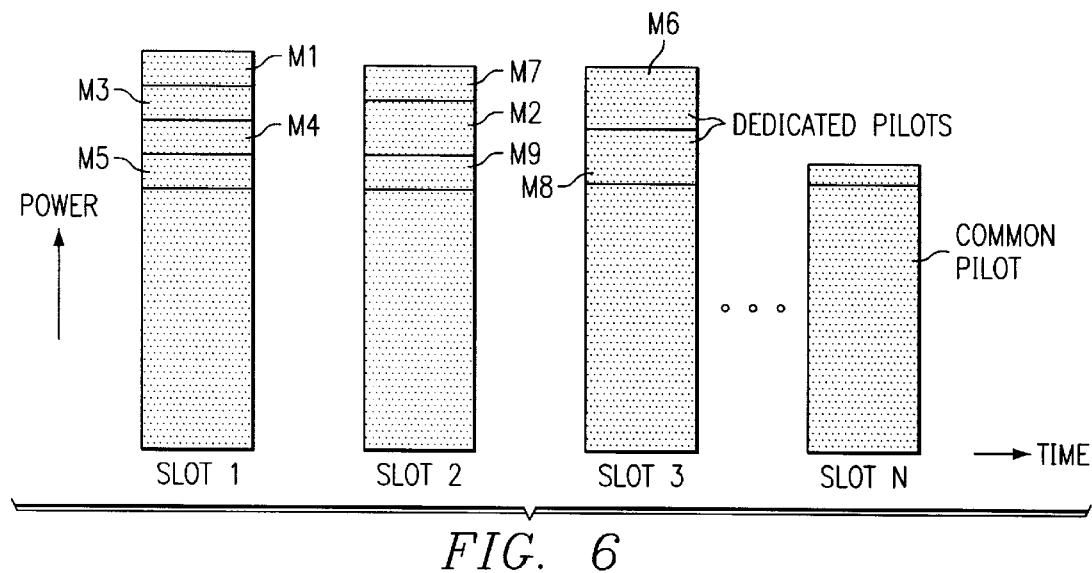
FIG. 6 is a graph of signal power for multiple beam dedicated pilots in plural time slots implemented by the FIG. 2 base station in accordance with principles of the present invention.

FIG. 6 illustrates for the example of a dedicated pilot base station, such as base station 12, that the power level of the common pilot is maintained at a constant level for each of time slots 1 through n of the time divided forward link signal sequence within a service cycle. By maintaining the common pilot at a reference amplitude, typically selected to be a highest level without causing interference to adjacent cells, each mobile within a service sector can determine its SINR based on common pilot received amplitude relative to noise and interference also present at the mobile. Extra forward link beam transmit power is used to add one or more dedicated pilots to the common pilot for each formation of simultaneous beams.

Figure 7:
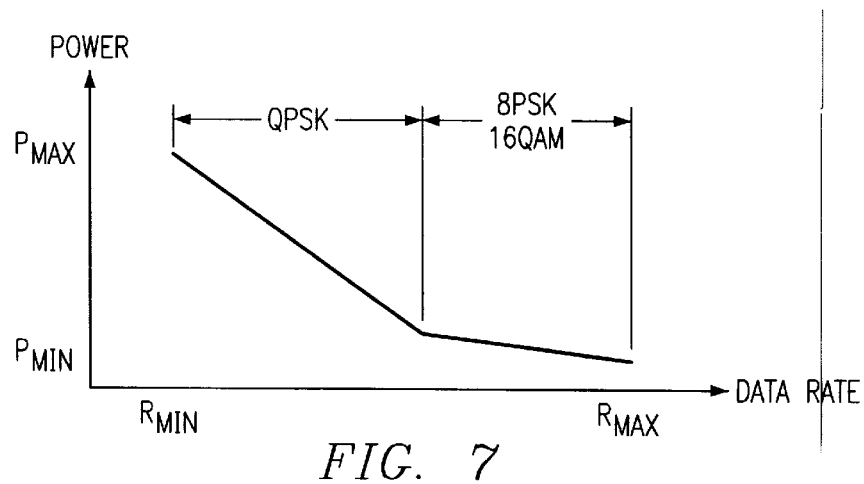
FIG. 7 is a graph of dedicated pilot power versus data rate for the dedicated pilots shown in the FIG. 6 graph.

As graphed in FIG. 7, the power level of a particular dedicated pilot is inversely related to data rate of the mobile to which the beam is directed. Where a mobile's forward link data rate R is at a minimum level $R_{min}$, the amplitude of the mobile's corresponding forward link dedicated pilot is made to be the highest level, which may be as high as 50 percent of the effective radiated power (ERP) of the common pilot. (A dedicated pilot power level higher than 50 percent of the ERP of the common pilot risks introducing unacceptable interference at mobiles being serviced within an adjacent cell). An example of two relatively high level dedicated pilots is found in time slot 3 of FIG. 6. Where a mobile's forward link data rate R is at a maximum level $R_{max}$, the ERP of the mobile's corresponding forward link dedicated pilot is made to be a minimum level, such as 10 percent of the ERP of the common pilot. An example of four minimum ERP dedicated pilots is found in time slot 1 of the FIG. 6 diagram.

At lower data rates a robust four level modulation format, such as quadrature phase shift keying (QPSK), is preferred. At high data rates it is practical to use a larger constellation modulation format, such as 8-level PSK or 16-level quadrature amplitude modulation (QAM). At the higher data rates it is important to maintain the dedicated pilot at a minimum effective level. Thus, as shown in FIG. 7, the dedicated pilot power level falls at a relatively steep rate in relation to increasing data rate for QPSK modulation, and thereafter falls at a much more shallow rate in relation to increasing data rate for 8 PSK modulation and 16 QAM.

In accordance with principles of the present invention, the average data rate for a particular mobile within a service sector will be at least as high as a data rate within a non-beam forming conventional HDR base station. By using simultaneously formed beams, the latency ratios can be large. The throughput performance of a particular service sector is analyzed for multiple forward link beams with dedicated pilots and without dedicated pilots.

Optionally, mobile units within the service sector may be equipped with interference cancellation techniques by using e.g., two receive antenna elements and two respective receiver chains. In such mobile units, interference cancellation is carried out by signal cancellation techniques enabled by the dual receiver signal channels.

Combinations of mobiles suitable for receiving simultaneous transmission are determined based on the locations and data rates of the particular mobile stations relative to the base station (the base station accurately determines angle and radius for each mobile as part of the reverse link and forward link beam forming process). Particular results depend on the actual propagation environments and parameters applicable to each particular service sector. A combination of mobiles is said to be "compatible" for simultaneous transmission if the data rate achievable with the particular combination is equal to or greater than the data rate achievable using a common pilot, conventional HDR data rate without simultaneous beam forming for each mobile of the combination. In this regard, compatible combinations which are subsets of other compatible combinations are discarded as unnecessary. In statistically rare circumstances a compatible combination might comprise a single active mobile station, in which case the aggregate data rate for such a single unit group would equal the conventional HDR data rate.

In accordance with principles of the present invention, a learning method is employed to determine the propagation environment of the particular service sector, preferably in a lightly loaded operating situation as late at night when few mobiles are active within a service sector. Initially, a combination of mobiles is tried. In the lightly loaded environment, the base station can form beams to an actual mobile and other imaginary or phantom mobiles artificially deemed to be present within a proposed combination. Beams are simultaneously formed to the active mobile and to the phantom mobiles, and the interference level resulting to the active mobile, as measured by highest acceptable data rate determined by the mobile, can aid in determining whether the proposed combination will be compatible for actual mobiles during more heavily loaded conditions. If a particular combination is determined to be incompatible, knowledge of the incompatibility is stored within a compatible combination data base established at the base station. Other combinations may then be tried, and successes/failures recorded as part of the base station learning process.

The learning method is also carried out to determine the propagation environment of the particular service sector during more heavily loaded conditions. For example, if a particular combination fails to communicate successfully during a heavily loaded operating condition, that failure is recorded in the data base, and the base won't repeat the same combination until a predefined time out interval has elapsed, since the incompatibility may be attributable to transient factors within the service sector, including weather, moisture, temperature, etc. Eventually, the base station will have a record of compatible combinations of mobiles in varying loading conditions and will be able to use that record in determining which mobiles at any given time can receive simultaneously formed forward link beams.

In FIG. 6 slot 1, the transmission of simultaneous beams includes beams directed to mobiles 1, 3, 4 and 5. During time slot 2 simultaneous beams are directed to mobiles 2, 7 and 9. During slot three simultaneous beams are directed toward mobiles 6 and 8, for example.

In any particular service sector certain mobiles, such as mobile M1 in FIG. 3 may be very close to the base station 12. In this case the nearby mobile has a large angle spread. Therefore, it is possible and sometimes likely that none of the other mobiles are compatible with the nearby mobile. In this situation during one of the time slots the base station forms a single beam which covers the nearby mobile's angle spread (which theoretically but not necessarily could extend across the whole sector) to send the traffic to the nearby mobile. As the number of mobile stations increases a statistically more uniform distribution of mobiles finds them located in space with most of the mobiles located nearer to the edge of the service sector than to the base station 12.

When a mobile requests traffic data, the base not only services the requesting mobile, it simultaneously serves a combination of other mobiles which request traffic data and are determined to be compatible with the requesting mobile by reference to the base station's data base. The particular combination is selected to yield a highest overall aggregate data throughput for the service sector. The base station beam forming methodology always tries to achieve a greatest number of simultaneous beams for each compatible combination. For example, in the FIG. 3 example where the service sector is 120 degrees and there are four forward link antennas, a maximum number of simultaneous beams might be four (minimum of thirty degrees separation between adjacent beams). In that case, the base station looks at all of the mobiles requesting service and determines whether there are four mobiles of the requesting group which lie within a compatible combination for simultaneous beam forming. If so, four beams are simultaneously formed during one time slot, and those four mobiles simultaneously receive their respective forward link data from the base station via the four simultaneous beams. Once compatible combinations of four mobiles have been exhausted, the base station then considers combinations of three mobiles, and then combinations of two mobiles, and then single mobiles, until all mobiles requesting service are served during available time slots.

In the conventional HDR method, a maximum of 29 mobiles can be served at any given time within a service sector of a CDMA wireless communications system. In order that the new method provide a data rate for every mobile which is at least equal to the conventional HDR data rate, the base station first considers a first mobile presently having the lowest data rate, and considers all compatible combinations which include this first mobile, picking the combination which results in the highest aggregate data throughput. The selected combination is served for a fraction of the total transmit time such that the average data rate for the first mobile is at least equal to the data rate of the conventional HDR system. While this first mobile receives forward link data at a rate not less than the conventional HDR data rate, the other mobiles within the combination receive forward link data at data rates well in excess of the conventional HDR base line rate. This method achieves a desired high base station aggregate data throughput for this particular combination. Then, a second mobile having the next lowest data rate and which is not a member of the first combination is considered along with other mobiles awaiting service by the base station, and a combination which results in the highest base station aggregate data throughput is selected. The second mobile and the other mobiles of the second combination receive forward link data transfers during a second slot which represents another fraction of the total transmit time sufficient to enable the second mobile to receive forward link data at or above the base line conventional HDR data rate. This process of forming compatible combinations and sending forward link data to the mobiles of each combination during fractions of total transmit time continues until all mobiles within the service sector have been serviced.

After all of the mobiles have been grouped into compatible combinations and serviced via simultaneous beams as explained above, a fraction of total transmit time will typically remain available for further use. One approach may be to use the remaining time to serve the combination of mobiles having the highest aggregate data throughput. This approach will result in the highest overall service sector aggregate data rate, and some mobiles will receive data at exceptionally high data rates. An alternative approach which results in lower overall aggregate data rate, but which more equitably services all mobiles is to serve each compatible combination in proportion to the fraction of time previously given to that combination. Within the conventional HDR approach, mobiles closer to the base station typically receive data at the highest data rates. In contrast to conventional HDR, in the approach of the present invention not only do the mobiles closer to the base receive higher aggregate data rates, but also the mobiles which may be more distant from the base station receive higher aggregate data rates, depending upon their angle and distance from the base station as explained above.

Figure 8:
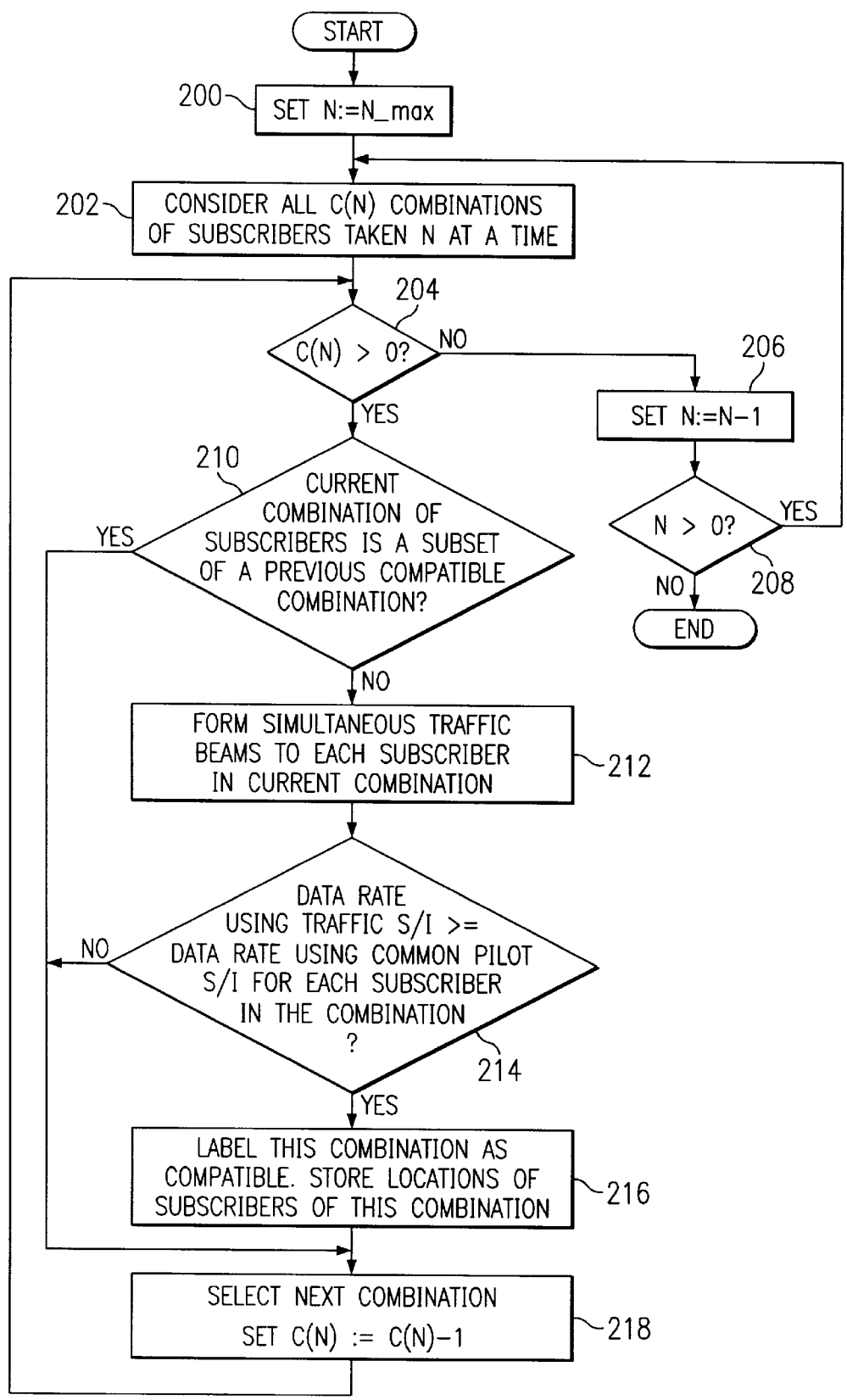
FIG. 8 is a flowchart of a learning mechanism method for determining and recording combinations of compatible mobile station subscribers in accordance with principles of the present invention.

FIG. 8 is a flowchart of a learning mechanism or method for determining which combinations of service subscriber (mobile) locations are "compatible" for transmission using simultaneous forward link beams in accordance with principles of the present invention. In the FIG. 8 example, the largest combination N_max is made equal to 4, although N_max may be larger or smaller than 4. Since location compatibilities relative to beam forming can be determined ahead of time and recorded as a data base, the steps of FIG. 8 must be carried out at least once, and are most preferably carried out frequently, during different traffic loading and temporal conditions. Compatibility can be determined from time to time or as a continuously-updating process as desired in order to verify and render current the accuracy of the resultant compatibile combination data base. A combination of subscriber locations is said to be compatible if, for each location within the combination, the data rate achievable using the SINR of the traffic channel is greater than or equal to the data rate achievable using the SINR of the common pilot channel (conventional HDR method).

In a first step 200 following flow start, the number N of mobiles to consider as a combination is set to the maximum value, e.g. 4. At step 202 out of L locations considered, all C(N)=L!/(N!(L−N)!) combinations of subscriber locations are identified, taken N at a time. All combinations with N simultaneous users are then selected and recorded at the step 202. A logical step 204 recursively determines if there are no further combinations of N simultaneous users remaining to identify. If there are no further combinations of simultaneous users, the number N of simultaneous users is decremented by one at a step 206. A logical step 208 then determines if the resultant number N has reached zero. If so, the FIG. 8 method ends. If not, a return is made to step 202 and the process repeats. If further combinations of N simultaneous users remain, as tested at the step 204, a logical step 210 is reached. Step 210 tests whether any combination of locations is a subset of a previously identified combination. If so, that combination is removed from consideration at a step 210 and process flow passes directly to a process step 218 which selects the next combination and sets C(N) equal to C(N)−1. If not, a process step 212 is reached at which simultaneous traffic beams are formed and sent to each subscriber (mobile) location of a currently identified combination. Following transmission of the simultaneous beams to each subscriber of the combination, the effective data rates at each subscriber location are fed back via the reverse link to the base station from each mobile station of the combination and recorded. A logical step 214 then tests the results to determine whether the current effective data rate is at or above the conventional HDR data rate.

If the tested current effective data rate is at or above the conventional HDR data rate as determined by step 214, the particular combination of subscriber locations is labeled as compatible and the respective locations of the subscriber stations within this combination relative to the base station are stored as a compatible combination of mobiles for simultaneous beam forming in the data base at a step 216. If the present combination is not compatible, as determined at step 214, the next combination is selected at the step 218, and process flow is returned to step 204 and repeated for the next combination. In this manner a comprehensive data base of compatible combinations, sorted by aggregate throughput for each combination, is obtained for various numbers of simultaneous beams. This data base may be developed in real time, or it may be developed during off-peak service hours with real and virtual mobiles, or in any other satisfactory way. Most preferably, the data base is continuously monitored and updated, so that the data base contains current information of compatible combinations within the service sector or cell. Once developed, the data base is available in real time to the base station 12 for determining compatible combinations of mobiles requesting high speed digital data transfers from the base. The base station then forms simultaneous forward link beams to the compatible combinations of requesting mobiles and achieves an aggregate data throughput in excess of standard HDR.

The goal of the beam forming method is to maximize forward link aggregate throughput while providing each subscriber Sk (mobile) with an average data rate greater than or equal to a target average data rate Dk. For example, the target average data rate Dk can be 4 kbps for all subscribers. Alternatively, the data rate Dk for each subscriber Sk can be calculated using the SINR of all subscribers and the throughput formula given in equation (3) of the Qualcomm HDR article referenced above.

FIG. 9 sets forth a base station operational flowchart for forming simultaneous forward link beams in accordance with highest service sector aggregate data throughput. Following process start, a step 230 labels all mobiles (service subscribers) within the service sector S1, S2, . . . SN. This step 230 may optionally include sorting all of the mobiles by data rate, wherein in the labeling process S1 represents a lowest requested data rate and SN represents a highest requested data rate. A logical step 232 then determines if there are subscribers presently requiring forward link service data transfer. If so, for one of the subscribers requesting service, Sk, a process step 234 identifies all compatible combinations in the data base which includes a location close to the location of subscriber Sk and selects from among those compatible combinations the combination with the highest aggregate base station traffic data throughput.

Each subscriber S has a minimum target average data rate represented by D. The value of D depends on the latency which depends on its channel conditions. A process step 236 causes the base station 12 to serve the combination selected by step 234 for a fraction of the total transmit time sufficient to cause the average data rate for station Sk (using simultaneous beam forming) to equal a target average data rate Dk for station Sk. Any subscriber Sj within the present combination including subscriber Sk and having an average data rate greater than or equal to a corresponding target average data rate Dj for that subscriber Sj is removed from the list of subscribers that require service, at a process step 238. A process step 240 sets k to the smallest subscriber index among the remaining subscribers that require service, and a return is made to the logical step 232. When there are no further subscribers requiring service as determined by step 232, a step 242 causes the remaining fraction of total transmit time to be used to serve that compatible combination previously determined to have the highest aggregate data throughput. Then, the process of FIG. 9 repeats itself until all traffic data has been transferred by simultaneous forward link beam forming to all of the compatible combinations of subscribers within the service sector.

The flowchart of FIG. 10 is identical to the flowchart of FIG. 9 just explained, up to a final step 244 which is different. When there are no further subscribers waiting for initial service, as determined by step 232, in the FIG. 10 method, the step 244 causes the remaining fraction of total transmit time to be used to serve every served compatible combination in proportion to the fraction of time a particular combination was served, thereby providing a more equitable distribution of excess data transfer capacity across all subscribers being served within the service sector.

TABLE 1

| Path Loss Exponent | Std. Dev. of Log-Normal Shadowing | Angle Spread Range | HDR data through put | Gain AAA (1) | Latency ratio (1) | Gain AAA (2) | Latency ratio (2) |
|---|---|---|---|---|---|---|---|
| 4 | 10 dB | 10°–60° | 563 kbps | 3.4x | 112 | 3x | 82 |
| 4 | 10 dB | 0°–30° | 590 kbps | 5.6x | 169 | 4.9x | 126 |
| 3 | 8 dB | 10°–60° | 435 kbps | 3.5x | 111 | 3x | 74 |
| 3 | 8 dB | 0°–30° | 441 kbps | 6.2x | 183 | 5.3x | 126 |

Table 1 presents data from a simulation using beam forming with a dedicated pilot. The path loss exponent is a quantification of path loss between the base station and the mobile station. The standard deviation of the lognormal shadowing represents a shadowing parameter between the base station and the mobile station. The angle spread range represents assumed angle spread at the mobile station, with an angle range of 10° to 60° conservatively assumed for stations close to the base station, and a range of 0° to 30° aggressively assumed for stations at a relatively distant location relative to the base station. The next column, HDR throughput represents a standard base line data throughput for the assumed conditions based on the conventional HDR standard. This forms a base line with a latency ratio of 5. The next column, Gain AAA(1) represents data throughput gain in accordance with the new method in which remaining time is given to the best combination. In the first row example the data rate gain is 3.4 times the base rate of 563 kbps. Since some mobiles will get significantly higher data rates when the remaining time is given to the best compatible combination over comparable mobiles within a conventional HDR paradigm, the latency ratio becomes very high, e.g., 112. When the second method (2) is used for allocating excess time equitably across all compatible combinations, rather than solely to the fastest compatible combination (1), the first row examplary data rate gain is 3 times greater than conventional HDR and the latency ratio falls to 82, denoting more equity in distribution of service among all of the mobiles being serviced in the service sector.

TABLE 2

| Path Loss Exponent | Std. Dev. of Log-Normal Shadowing | Angle Spread Range | HDR data through put | Gain AAA (1) | Latency ratio (1) | Gain AAA (2) | Latency ratio (2) |
|---|---|---|---|---|---|---|---|
| 4 | 10 dB | 10°–60° | 562 kbps | 2.2x | 66 | 1.8x | 38 |
| 4 | 10 dB | 0°–30° | 569 kbps | 3x | 89 | 2.6x | 58 |

Table 2 presents data from a simulation using beam forming without using a dedicated pilot. Even without the dedicated pilot, table 2 shows that significant data rate gains can be realized by using the principles of the present invention.

TABLE 3

| Path Loss Exponent | Std. Dev. of Log-Normal Shadowing | Angle Spread Range | HDR data through put | Gain AAA (1) | Latency ratio (1) | Gain AAA (2) | Latency ratio (2) |
|---|---|---|---|---|---|---|---|
| 4 | 10 dB | 10°–60° | 560 kbps | 10.6x | 342 | 6.6x | 49 |
| 4 | 10 dB | 0°–30° | 563 kbps | 14.6x | 371 | 9.7x | 66 |
| 3 | 8 dB | 10°–60° | 431 kbps | 11.6x | 399 | 6.9x | 56 |
| 3 | 8 dB | 0°–30° | 448 kbps | 16.1x | 426 | 10.3x | 73 |

Table 3 presents data from a simulation using beam forming using a dedicated pilot and interference cancellation at the mobile station as by using two antennas, two receiver chains and known cancellation techniques such as the directed matrix inversion method described in U.S. Pat. No. 6,014,570, entitled: "Efficient radio signal diversity combining using a small set of discrete amplitude and phase weights", the disclosure thereof being incorporated herein in its entirety by reference thereto. The latency ratio is lower in the case of excess time allocation method (2) because all mobiles are receiving improved data rates because of the interference cancellation. Even the lowest data rate mobile station gets a benefit in this arrangement. This approach (2) moves all mobile stations up along a data rate axis, and thereby renders the latency ratio smaller in overall magnitude.

TABLE 4

| Path Loss Exponent | Std. Dev. of Log-Normal Shadowing | Angle Spread Range | HDR data through put | Gain AAA (1) | Latency ratio (1) | Gain AAA (2) | Latency ratio (2) |
|---|---|---|---|---|---|---|---|
| 4 | 10 dB | 10°–60° | 560 kbps | 4.1x | 283 | 3.3x | 16 |
| 4 | 10 dB | 0°–30° | 564 kbps | 4.3x | 287 | 3.9x | 21 |

Table 4 presents data from a simulation using beam forming without using a dedicated pilot and interference cancellation at the mobile station. This table also demonstrates dramatic improvements in data transfer rates for both maximized throughput of method (1) and equitable throughput of method (2) when forward link beam forming occurs at the base station and interference cancellation techniques are employed at the mobile station, even though dedicated pilots are not present in the forward link.

While the present invention has been described with reference to particular embodiments, the description is only an example of the invention's application and should not be taken as a limitation. Various adaptations and combinations of features of the embodiments disclosed are within the scope of the invention as more particularly defined by the following claims.

What is claimed is:

1. A method for operating a base station serving multiple mobile stations within a predetermined service area, the base station including an adaptive antenna array and forward link beam forming circuit means for forming simultaneous multiple forward link beams, each beam being spatially directed and adapted to serve one of the multiple mobile stations, the base station being connected to a digital network for receiving packets of digital traffic data and for sending said packets to said mobile stations via said adaptive antenna array, the method comprising steps of:

a. separating the multiple mobile stations into L!/N! (L–N)! groups of mobile stations, where L is a total number of mobile stations presently requesting traffic data transfer and N is an integer corresponding to a maximum number of simultaneous forward link beams capable of being formed by the adaptive antenna array and beam forming circuit means;

b. determining which of said groups can be served by compatible simultaneous forward link beams and recording each group determined to be compatible as a compatible group, c. if a mobile station remains outside of every compatible group determined by step b, reducing the magnitude of N by an integer factor X, and repeating step a and step b until all the L mobile stations are included in compatible groups; and, d. forming simultaneous plural forward link data beams to mobile stations of a compatible group during a time interval accorded to said group from among a plurality of time intervals within a service cycle, there being a time interval accorded to compatible groups such that the L mobile stations receive digital traffic data during the service cycle.

2. The method set forth in claim 1:
wherein said step b. includes a further step of:
   e. determining from all of the compatible groups which contain a location close to the location of a currently unserved lowest mobile index said mobile Sk one group of mobiles including mobile Sk and other mobile/s Sj having a highest aggregate throughput data rate;
wherein step d includes a further step of:
   f. forming simultaneous forward link data beams to said one group of mobiles including mobile Sk for a time interval of the service cycle, such that the average data rate for mobile Sk is equal to a target average data rate Dk;
and comprising further steps of:
   g. removing the mobile/s Sj within the said one group whose average data rate is greater than the target average data rate Dj from a service list; and,
   h. determining a next currently unserved lowest mobile index Sk+1, and repeating steps a–g until the L mobile stations have received traffic data during the service cycle.

3. The method set forth in claim 2 comprising further step of forming simultaneous forward link data beams to serve a compatible group having a highest aggregate data throughput during a remainder of the service cycle.

4. The method set forth in claim 2 comprising a further step of forming a plurality of simultaneous forward link data beams for a remainder of the service cycle to serve each one of said compatible groups in proportion to a fraction of the time interval previously used by said group during the service cycle.

5. The method set forth in claim 1 wherein each mobile requests a desired data transfer rate from the base station via a reverse link and wherein the base station estimates relative angular location and radial distance within the service area of each said mobile from the base station.

6. The method set forth in claim 1 wherein the base station generates and transmits a dedicated pilot with each beam within simultaneously formed forward link beams sent to a compatible group of mobiles.

7. A method for operating a base station serving a spatial service sector within a wireless communications system comprising steps of:
   determining respective locations of a group of mobiles within the service sector requesting high speed digital data packet transfers,
   forming compatible combinations of mobiles of said group based on respective compatible locations and effective data transfer rates of said mobiles,
   forming simultaneous beams to mobiles within each said compatible combination, and
   simultaneously sending digital data packets to said mobiles via said simultaneous beams during a time slot of duration sufficient such that a mobile of each said combination having a lowest effective data transfer rate receives said packets at a rate at least equal to a predetermined base line reference data transfer rate.

8. The method set forth in claim 7 wherein said simultaneous beams are formed to include a common pilot having a fixed amplitude for enabling each mobile of said group to determine an effective data transfer rate based on received amplitude of said common pilot in relation to noise and interference.

9. The method set forth in claim 8 wherein said beams are formed to include dedicated pilots as well as the fixed amplitude common pilots, wherein a dedicated pilot is formed for and sent to a mobile of a said compatible combination at an effective radiated power inversely related to effective data transfer rate of said mobile.

10. The method set forth in claim 8 wherein a mobile of said group includes interference cancellation means for canceling interference received by said mobile.

11. The method set forth in claim 10 wherein said mobile of said group includes at least two receive antennas and at least two receive channels and carries out interference cancellation by destructively combining interfering signals commonly received by both receive antennas and receivers.

12. The method set forth in claim 11 wherein said beams are formed to include dedicated pilots as well as the fixed amplitude common pilots, wherein a dedicated pilot is formed for and sent to a mobile of a said compatible combination at an effective radiated power inversely related to effective data transfer rate of said mobile.

13. The method set forth in claim 7 wherein the base station and the mobiles of the wireless communications system employ a code division multiple access air-interface.

14. The method set forth in claim 7 wherein aggregate duration of the time slots of all compatible combinations is less than necessary to provide all mobiles of said group with data transfer of packets at a rate at least equal to said predetermined base line reference data transfer rate and wherein a remaining fraction of time of a service cycle is used to send additional data packets to at least one of said mobiles of said group.

15. The method set forth in claim 14 wherein the remaining fraction of time is used to send additional data packets to a one of said compatible combinations having an aggregate highest data transfer rate during the service cycle.

16. The method set forth in claim 14 wherein the remaining fraction of time is used to send additional data packets to all of said compatible combinations in proportion to the time slot duration allotted to each said compatible combination during the service cycle.

17. The method set forth in claim 7 wherein the step of forming compatible combinations of mobiles of said group based on respective compatible locations is carried out by forming and storing a compatible location data base of compatible combinations of mobile station locations at the base station, by measuring propagation conditions in the direction of each compatible location within the service sector.

18. The method set forth in claim 17 carried out during non-peak traffic conditions of said service sector.

19. The method set forth in claim 17 carried out during peak traffic conditions of said service sector.

20. The method set forth in claim 7 wherein the step of forming compatible combinations of mobiles of said group based on respective compatible locations and effective data transfer rates of said mobiles includes progressive steps of:
   forming a service queue of compatible combinations by identifying C(N) combinations of mobiles taken N at a time until all mobiles of said group are within a said combination;

transferring data packets to the mobiles of a said combination via simultaneous forward link beams from said base station;

determining whether data rate measured by each mobile of the combination is equal to or in excess of an effective data transfer rate based on received amplitude of said common pilot in relation to noise and interference for said mobile and if so recording said combination as a compatible combination; and, continuing to form compatible combinations and simultaneous beams until all mobiles of said group are recorded within a compatible combination.

* * * * *